Dec. 2, 1952  W. A. WISEMAN  2,619,945
INTAKE MANIFOLD
Filed Sept. 1, 1951  3 Sheets-Sheet 1

INVENTOR.
WILLIAM A. WISEMAN
BY
Hauke & Hardesty
ATTORNEYS

INVENTOR.
WILLIAM A WISEMAN

Dec. 2, 1952     W. A. WISEMAN     2,619,945
INTAKE MANIFOLD

Filed Sept. 1, 1951     3 Sheets-Sheet 3

INVENTOR.
WILLIAM A. WISEMAN

ATTORNEYS

Patented Dec. 2, 1952

2,619,945

UNITED STATES PATENT OFFICE 2,619,945

INTAKE MANIFOLD

William A. Wiseman, Muskegon, Mich., assignor to Continental Motors Corporation, Muskegon, Mich., a corporation of Virginia Application September 1, 1951, Serial No. 244,804

3 Claims. (Cl. 123—56)

My invention relates to a fuel mixture intake system for an internal combustion engine and more particularly to an intake system for a multi-cylinder engine having horizontally opposed cylinders.

Various types of intake manifolding having been employed with these opposed cylinder type engines and generally it has been found practical to nest the carburetor and a spider type intake manifold beneath the engine crankcase rearwardly of the depending oil sump. However, with some installations it is found to be more practical to mount the intake system on top of the engine crankcase and therefore because of height limitations, the spider type intake manifold with an updraft or downdraft carburetor did not fit into the power plant assembly. We were thus confronted with the problem of incorporating a side draft carburetor with an intake manifold that could function to give equally as efficient distribution of the fuel mixture to the various engine cylinders.

An object of my present invention is to obtain efficient and satisfactory fuel mixture distribution to a multicylinder engine of the horizontally opposed cylinder type, by constructing an intake manifold of novel design constructed to overlie the engine crankcase and to be connected with a side draft carburetor.

A further object of my invention is to maintain the overall height of a power plant assembly to a minimum, when such power plant incorporates a multicylinder engine of the horizontally opposed cylinder type having an intake system disposed above the engine crankcase, by constructing an intake manifold structure incorporating a side draft carburetor and lateral runners feeding the fuel mixture to a plurality of individual cylinders in each bank of cylinders and so arranging said lateral runners that they are superimposed one above the other and extend generally in a common plane normal to the axis of the primary fuel mixture conducting portion connected with a side draft carburetor.

For a more detailed understanding of my invention reference may be had to the accompanying drawings illustrating a preferred embodiment of the invention in which like parts refer to like parts throughout the several views, and in which Fig. 1 is a plan view of a multicylinder internal combustion engine of the horizontally opposed cylinder type, and showing my novel and improved fuel mixture intake system;

Figure 1:
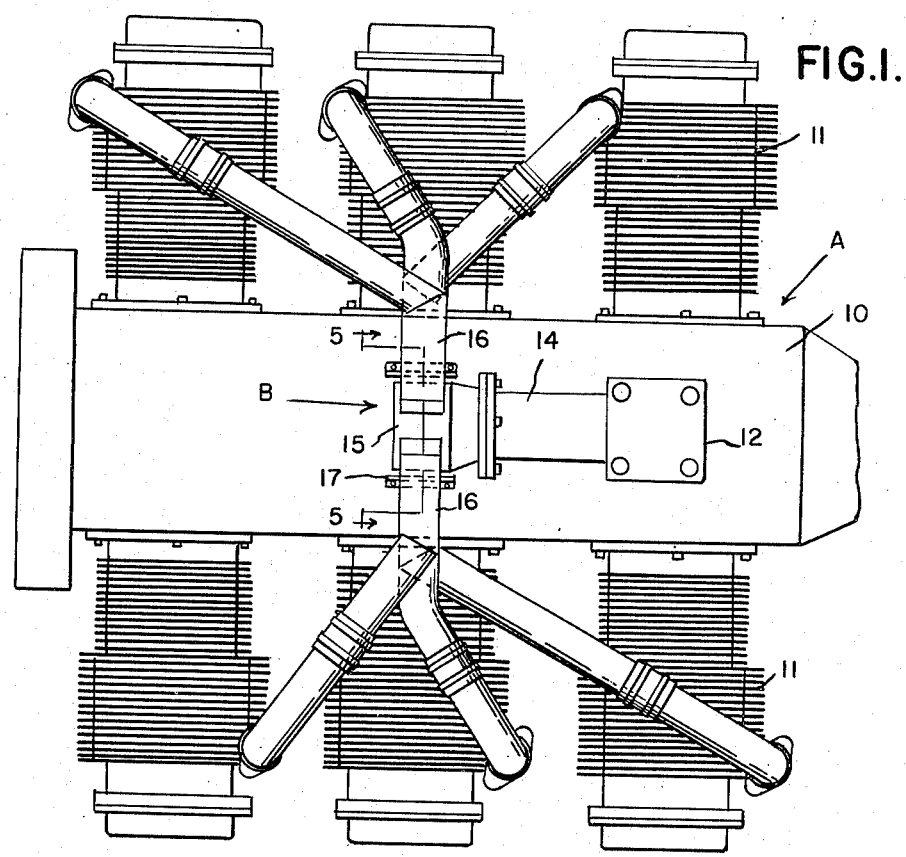
Figure 2:
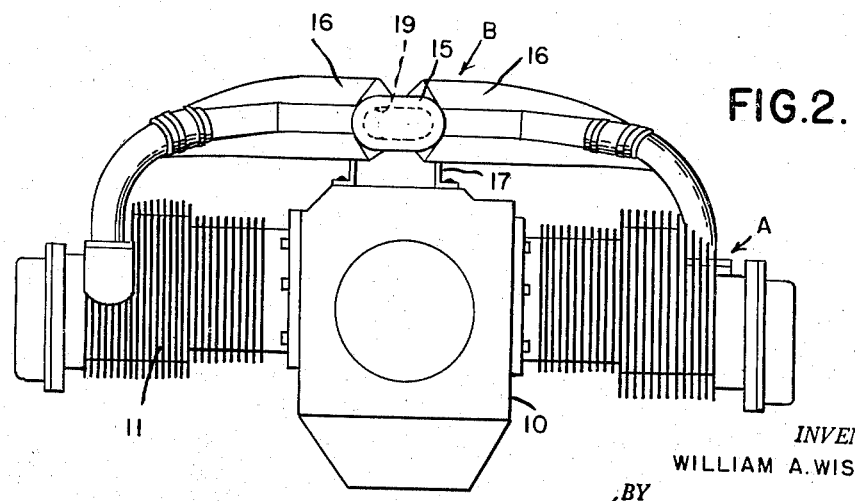
Fig. 2 is an end elevational view thereof.
Figure 3:
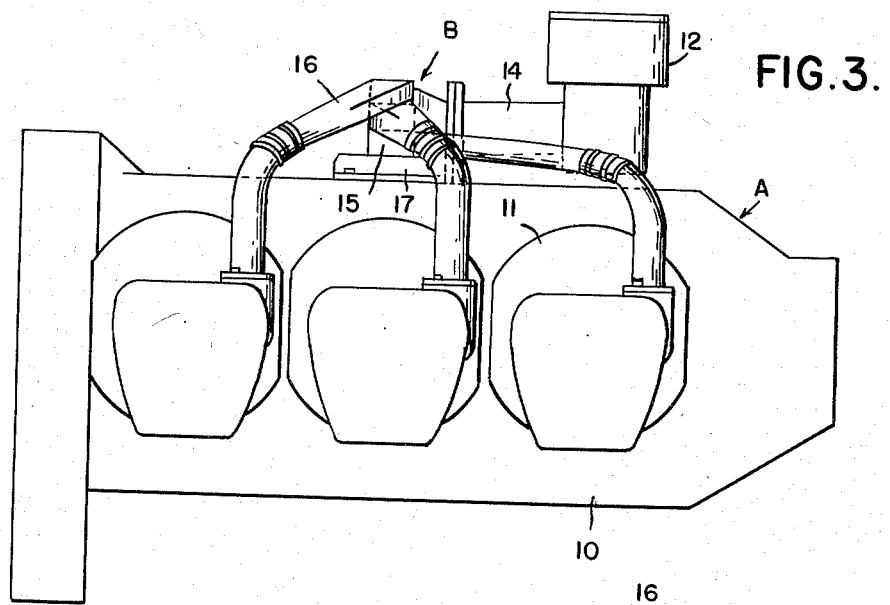
Fig. 3 is a side elevational view thereof.

I have preferably illustrated my invention in connection with an air cooled multicylinder engine of the horizontally opposed cylinder type having three cylinders in each bank, since the present application of my invention has been particularly constructed for assembly with this type and size of engine, although it will be obvious that the invention may be incorporated with other size and type of engines if so desired.

In the accompanying drawings, the internal combustion engine is represented as a whole by reference character "A," this engine having a fuel mixture induction system "B" assembled therewith. The engine comprises a crankcase 10 having two banks of horizontally opposed air cooled cylinders 11, and in the present application there are three such cylinders in each bank. A side draft fuel mixture forming device or carburetor 12 is mounted above the engine crankcase and the carburetor is provided with a horizontal primary fuel mixture conducting portion 14, preferably extending longitudinally of the engine crankcase and centrally thereof.

Figure 4:
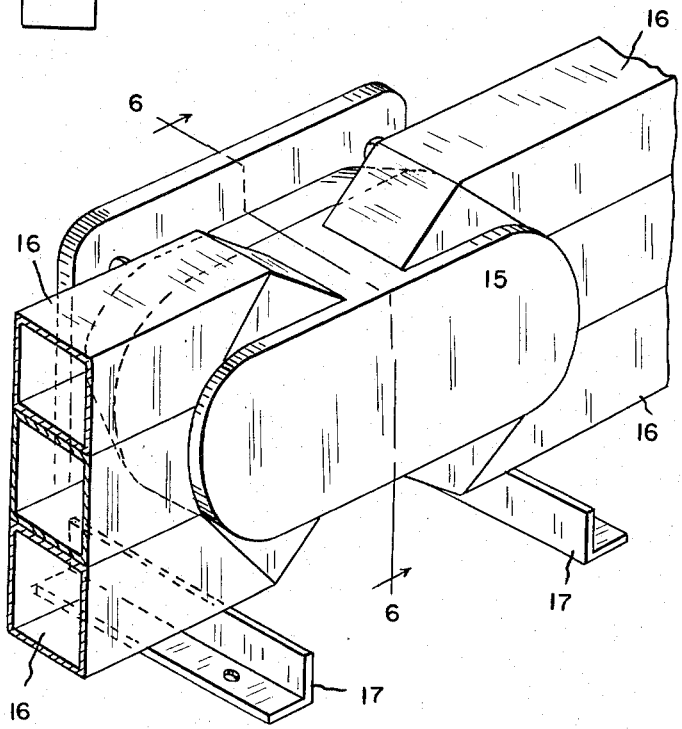
Fig. 4 is a fragmentary detail view of the intake manifold showing the disposition of the lateral fuel mixture conducting runners.
Figure 6:
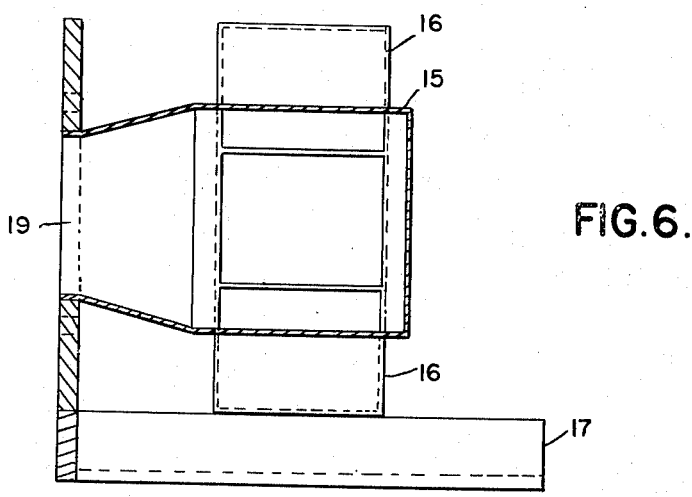
Fig. 6 is a vertical sectional view taken on the line 6—6 of Fig. 4.
Figure 5:
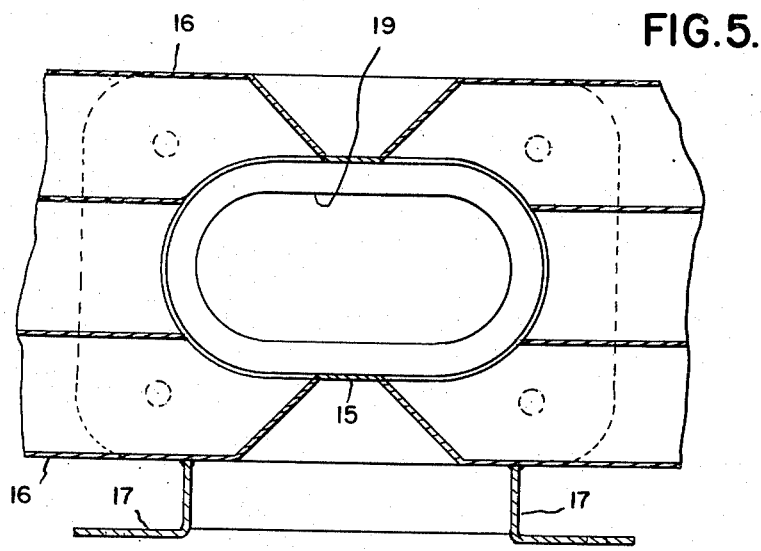
Fig. 5 is a fragmentary vertical detail sectional view of the intake manifold structure taken on the line 5—5 of Fig. 1.

The primary fuel mixture conducting portion opening communicates with the distributing chamber 15 and a plurality of lateral runners 16 connect the distributing chamber with the individual engine cylinders (see Fig. 1). The distributing chamber is elongated, the longer axis extending transversely of the engine crankcase and normal to the axis of the primary conducting portion. The inlet openings of these two groups of lateral runners are disposed in the ends of this elongated distributing chamber and are located one above the other (see Figs. 4 and 5) substantially in a common plane extending normal to the aforesaid axis of the primary fuel mixture conducting portion 14. Brackets 17 are secured, preferably by welding to the manifold structure and mounted directly on the top of the engine crankcase. It will also be observed that these inlet openings of the lateral runners are symmetrically disposed with respect to the opening 19 connecting said distributing chamber with the primary fuel mixture conducting portion so that there is obtained a very uniform distribution of fuel mixture to the lateral runners, the timing of the engine being such that the fuel mixture is alternately sucked into the runners connected with the opposite ends of the distributing chamber.

The lateral runners extend transversely of the engine crankcase, stacked up one on top of the other for substantially the full width of said crankcase and the outer extensions of same diverge to connect with the individual cylinder intake ports (see Fig. 1).

It will be apparent to those skilled in the art to which my invention pertains that various changes and modifications may be made therein without departing from the spirit of my invention or from the scope of the appended claims.

I claim:

1. A fuel-air mixture intake system for a multi-cylinder internal combustion engine having a crankcase and horizontally opposed cylinders, said system comprising a side draft carburetor mounted on top of said crankcase and having a horizontally extending primary fuel mixture conducting portion, a fuel mixture distributing chamber communicating therewith, and a plurality of grouped lateral fuel mixture conducting runners opening into opposite sides of said distributing chamber and each connected with an individual engine cylinder intake port, said lateral runners of each group having inlet openings communicating with the distributing chamber superimposed one above the other and substantially disposed in a common plane normal to the axis of the primary fuel mixture conducting portion.

2. A fuel-air mixture intake system for a multi-cylinder internal combustion engine having a crankcase and horizontally opposed cylinders, said system comprising a side draft carburetor mounted on top of said crankcase and having a horizontally extending primary fuel mixture conducting portion, a fuel mixture distributing chamber communicating therewith, and comprising a horizontally elongated chamber with rounded ends, the longer axis of said chamber extending normal to the axis of the primary fuel mixture conducting portion, and a plurality of lateral fuel mixture runners having inlet openings in the rounded end portions of the elongated distributing chamber, said openings superimposed one above the other and substantially symmetrically disposed with respect to the opening connecting said distributing chamber with said primary fuel mixture conducting portion, said lateral inlet openings disposed in substantially a common plane extending normal to the axis of said primary fuel mixture conducting portion.

3. A fuel-air mixture intake system for a multi-cylinder internal combustion engine having a crankcase and horizontally opposed cylinders, said system comprising a side draft carburetor mounted on top of said crankcase and having a horizontally extending primary fuel mixture conducting portion, a fuel mixture distributing chamber communicating therewith, and a plurality of grouped lateral fuel mixture conducting runners opening into opposite sides of said distributing chamber and each connected with an individual engine cylinder intake port, said lateral runners of each group having inlet openings communicating with the distributing chamber superimposed one above the other and substantially disposed in a common plane normal to the axis of the primary fuel mixture conducting portion, said lateral runners disposed in a common plane normal to the longitudinal axis of the crankcase and extending laterally for substantially the full width of the crankcase in said common plane, and terminating in diverging extensions leading to the individual inlet ports of the respective engine cylinders.

WILLIAM A. WISEMAN.

No references cited.